(12) United States Patent
Moyers, II et al.

(10) Patent No.: US 7,725,999 B2
(45) Date of Patent: Jun. 1, 2010

(54) METHOD FOR POSITIONING AN EYELET IN A FEED-THROUGH ASSEMBLY

(75) Inventors: Thomas J. Moyers, II, Litchfield Park, AZ (US); Shauna L. Morones, Mesa, AZ (US)

(73) Assignee: Medtronic, Inc., Minneapolis, MN (US)

( * ) Notice: Subject to any disclaimer, the term of this patent is extended or adjusted under 35 U.S.C. 154(b) by 1341 days.

(21) Appl. No.: 11/192,473

(22) Filed: Jul. 29, 2005

(65) Prior Publication Data

US 2007/0039158 A1 Feb. 22, 2007

(51) Int. Cl.
 *B23P 11/02* (2006.01)
(52) U.S. Cl. ........................................ 29/447
(58) Field of Classification Search .............. 29/447, 29/446, 452, 428, 235, 234, 255, 282; 385/138; 228/49.1
See application file for complete search history.

(56) References Cited

U.S. PATENT DOCUMENTS

| | | | |
|---|---|---|---|
| 4,041,240 A | 8/1977 | Sipowicz | |
| 4,678,868 A | 7/1987 | Kraska et al. | |
| 4,940,858 A | 7/1990 | Taylor et al. | |
| 5,010,298 A * | 4/1991 | Uemura | 324/207.19 |
| 5,175,067 A | 12/1992 | Taylor et al. | |
| 5,294,241 A | 3/1994 | Taylor et al. | |
| 5,531,003 A | 7/1996 | Seifried et al. | |
| 5,643,694 A | 7/1997 | Heller | |
| 5,722,989 A | 3/1998 | Fitch et al. | |
| 5,821,011 A | 10/1998 | Taylor et al. | |
| 5,921,284 A | 7/1999 | Hauff | |
| 6,528,133 B1 | 3/2003 | Kim et al. | |
| 6,812,404 B1 | 11/2004 | Martinez | |
| 6,855,456 B2 | 2/2005 | Taylor et al. | |
| 6,935,549 B2 * | 8/2005 | Wolf | 228/49.1 |
| 2003/0180025 A1* | 9/2003 | Cens et al. | 385/138 |
| 2005/0142313 A1 | 6/2005 | Grah | |
| 2006/0061938 A1 | 3/2006 | Dombro et al. | |

FOREIGN PATENT DOCUMENTS

| | | |
|---|---|---|
| EP | 44068 A2 | 7/1981 |
| WO | 9106129 | 5/1991 |

* cited by examiner

*Primary Examiner*—John C Hong
(74) *Attorney, Agent, or Firm*—Carol F. Barry

(57) ABSTRACT

A feed-through subassembly includes a plurality of wires. The feed-through subassembly is positioned in a holding device such that the plurality of wires are pointed in an upward direction. A protective tube is placed over the plurality of wires. Heat is applied to the protective tube. A portion or all of the protective tube is shrunk.

4 Claims, 7 Drawing Sheets

US 7,725,999 B2

METHOD FOR POSITIONING AN EYELET IN A FEED-THROUGH ASSEMBLY

FIELD OF THE INVENTION

The present invention relates generally to assembly of an electronic device and, more particularly, to positioning of an eyelet for a feed-through assembly.

BACKGROUND OF THE INVENTION

Numerous devices (e.g., implantable medical devices (IMDs) electrochemical cells, etc.) are hermetically sealed. Hermetically sealed containers prevent liquid from contacting electronic components within a device. To connect with the electronic components, a feed-through assembly is inserted into a portion of the container.

A typical feed-through assembly consists of a conductive part (e.g., wires etc.), a ferrule, an insulator member (e.g. glass, ceramic etc.), and a seal. The ferrule includes an aperture configured to receive the insulator member. A seal is located between the ferrule and the insulator member. An eyelet, slipped over wires and seated into the insulator member, protects the insulator member from weld splatter. Weld splatter occurs during a subsequent welding operation to close the container. Failure to properly seat the eyelet into the insulator member may result in a defective feed-through assembly.

Presently, a semi-automated method seats an eyelet into the insulator member. In this operation, a device holds a feed-through subassembly in position. The wires extend from the feed-through subassembly in an upward direction while the eyelet is slid over wires and into the insulator member. The feed-through assembly then undergoes a welding operation to close the container. The equipment for the welding operation holds the feed-through assembly such that the wires are pointed down. An eyelet that is not properly seated may slip off during the welding operation. Once the eyelet slips from its original position, the insulator member is exposed to random weld splatter resulting from a subsequent welding operation. A large amount of the devices are deemed defective due to weld splatter. For example, some production runs produce 50% defective feed-through assemblies. Defective feed-through assemblies are typically discarded resulting in lost wages and material. It is therefore desirable to have a method that overcomes the limitations associated with a conventional feed-through assembly process.

BRIEF DESCRIPTION OF THE DRAWINGS

The present invention will become more fully understood from the detailed description and the accompanying drawings, wherein.

DETAILED DESCRIPTION OF THE EMBODIMENTS

Figure 1:
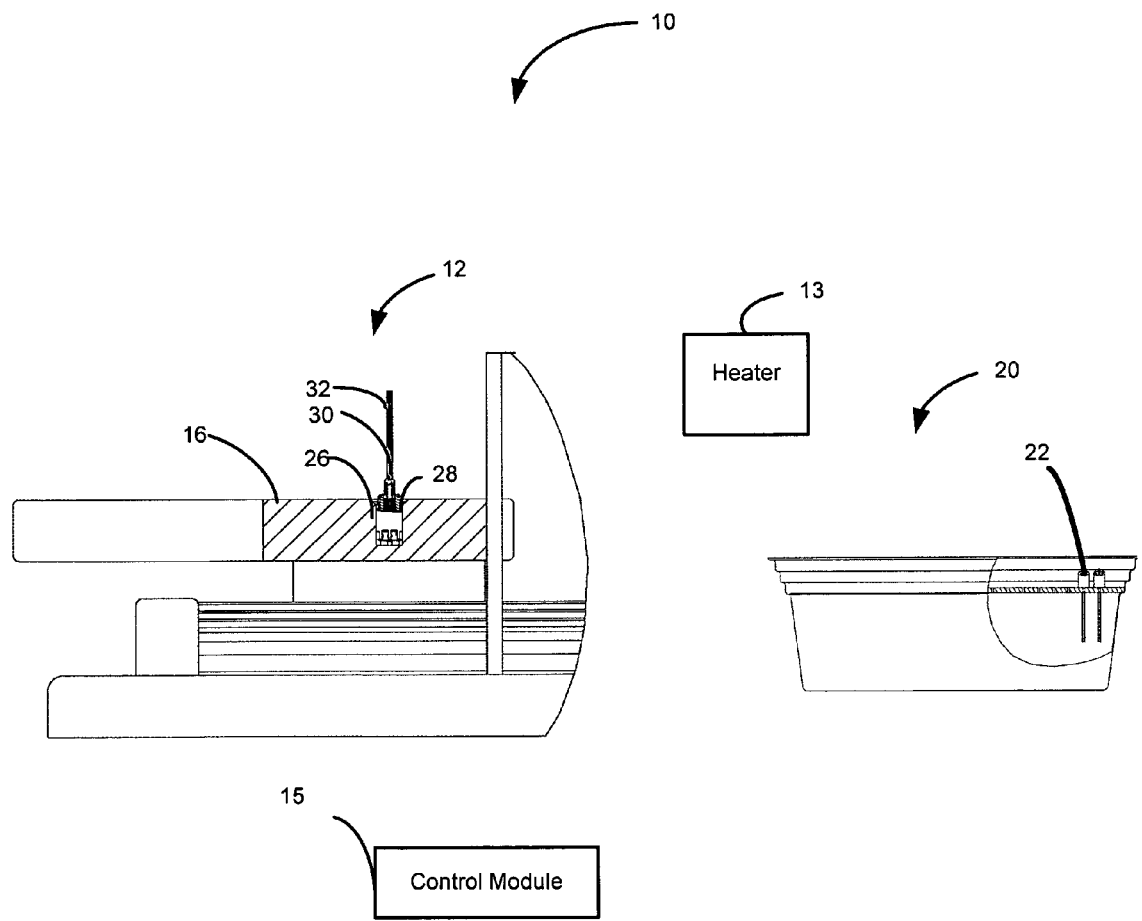
FIG. 1 is a perspective view of an exemplary eyelet positioning system.

The following description of an embodiment is merely exemplary in nature and is in no way intended to limit the invention, its application, or uses. For purposes of clarity, the same reference numbers are used in the drawings to identify similar elements. As used herein, the term "module" refers to an application specific integrated circuit (ASIC), an electronic circuit, a processor (shared, dedicated, or group) and memory that execute one or more software or firmware programs, a combinational logic circuit, or other suitable components that provide the described functionality.

The present invention is directed to a feed-through assembly. A feed-through subassembly includes a plurality of wires. The feed-through subassembly is positioned in a holding device such that the plurality of wires are pointed in an upward direction. A protective tube is placed over the plurality of wires. Heat is applied to the protective tube. A portion of the protective tube is shrunk. A ridged area is formed around in the protective tube. An eyelet is securely seated over the ridged area. This method of positioning the eyelet over a protective tube reduces defective feed-through assemblies.

Figure 2:
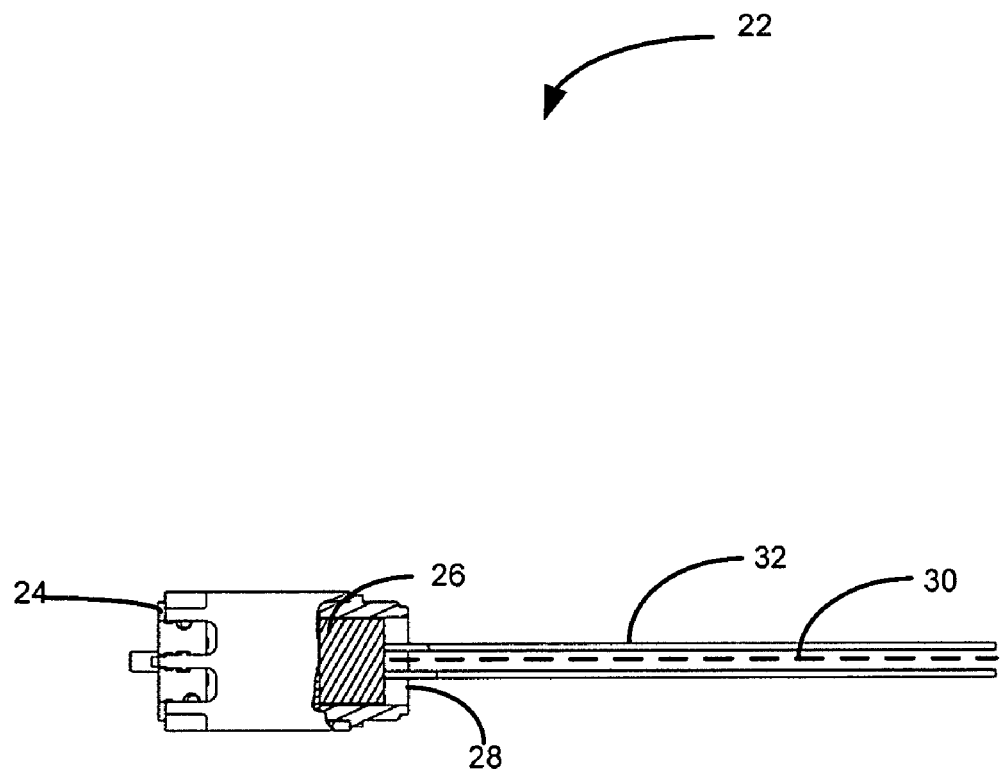
FIG. 2 is a perspective side view of an exemplary feed-through subassembly.
Figure 3A:
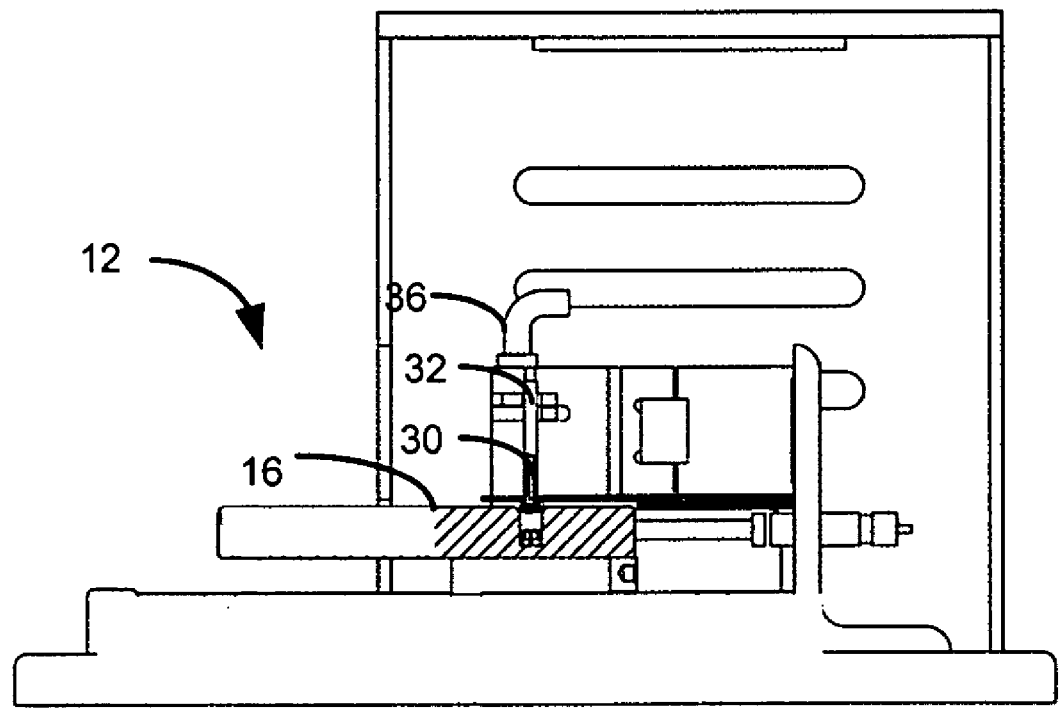
FIG. 3A is a perspective side view of an exemplary device to shrink a protective tube around a plurality of wires of a feed-through subassembly.

FIG. 1 depicts an exemplary eyelet positioning system 10. Eyelet positioning system 10 includes a securing device 12, heater 13, a handling tray 20, and a control module 15. Securing device 12 substantially immobilizes a feed-through subassembly 22 during assembly operations. Securing device 12 includes a holding fixture 16, and a counter-bore 28. Control module 15, coupled wirelessly or hard-wired to heater 13 and securing device 12, is configured to signal elements within eyelet positioning system 10 to automatically perform various functions described herein. Feed-through subassembly 22, depicted in greater detail in FIG. 2, is removed from handling tray 20. Feed-through subassembly 22 is secured at its base 24 to counter-bore 28. Wires 30 of feed-through subassembly 22 extend in an upward direction away from holding fixture 16. Protective tube 32 is then slid over wires 30 and against an insulator member 26. Insulator member 26 typically comprises glass or ceramic. Protective tube 32 extends from about 0.10 inches to 2.50 inches of wires 30 and has a thickness that ranges from about 0.004 inches to about 0.01 inches. Additionally, protective tube 32 includes a diameter of about 0.15 inches to about 0.18 inches. Protective tube 32 typically comprises a polymer (e.g., polytetrafluoroethylene (PTFE) etc.) or other suitable material. After being secured in counter-bore 28 through automatic or manual means, feed-through subassembly 22 is substantially immobilized in holding fixture 16. Feed-through subassembly 22 is then placed near or in contact with heater 13. An exemplary heater 13, such as heat grippers 36, is shown in greater detail in FIG. 3A.

Figure 3B:
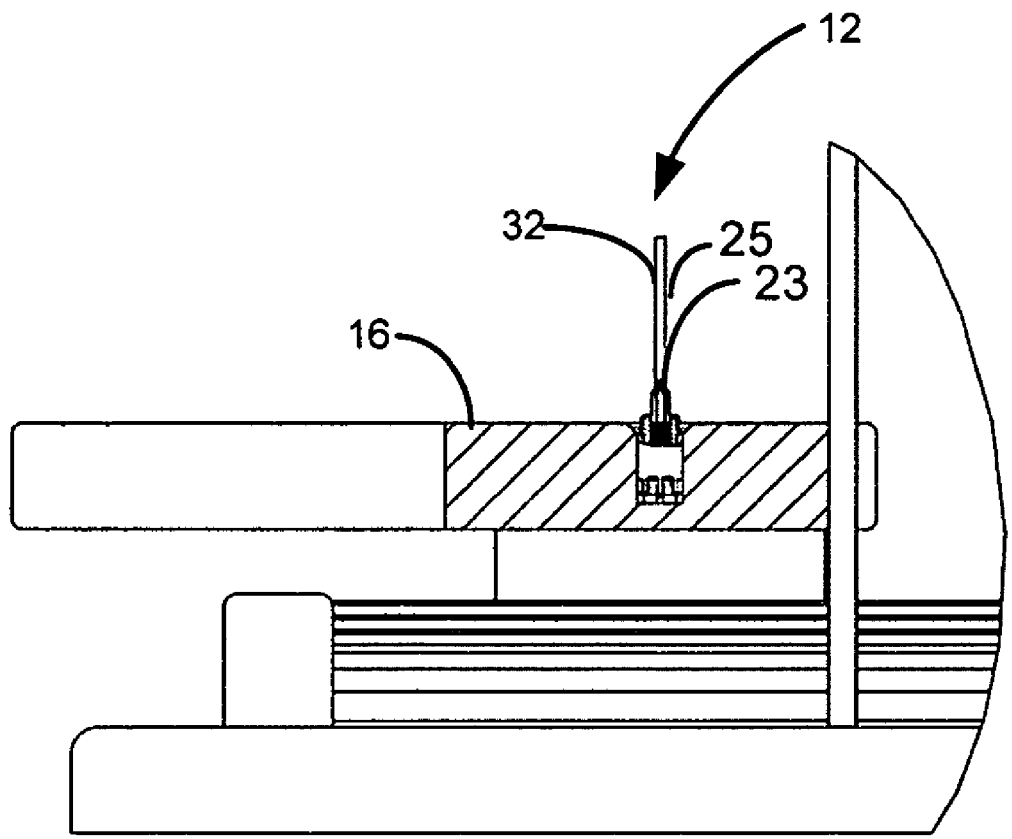
FIG. 3B is a perspective side view of a securing device and a protective tube that is shrunk around a wire(s) of a feed-through subassembly.
Figure 4:
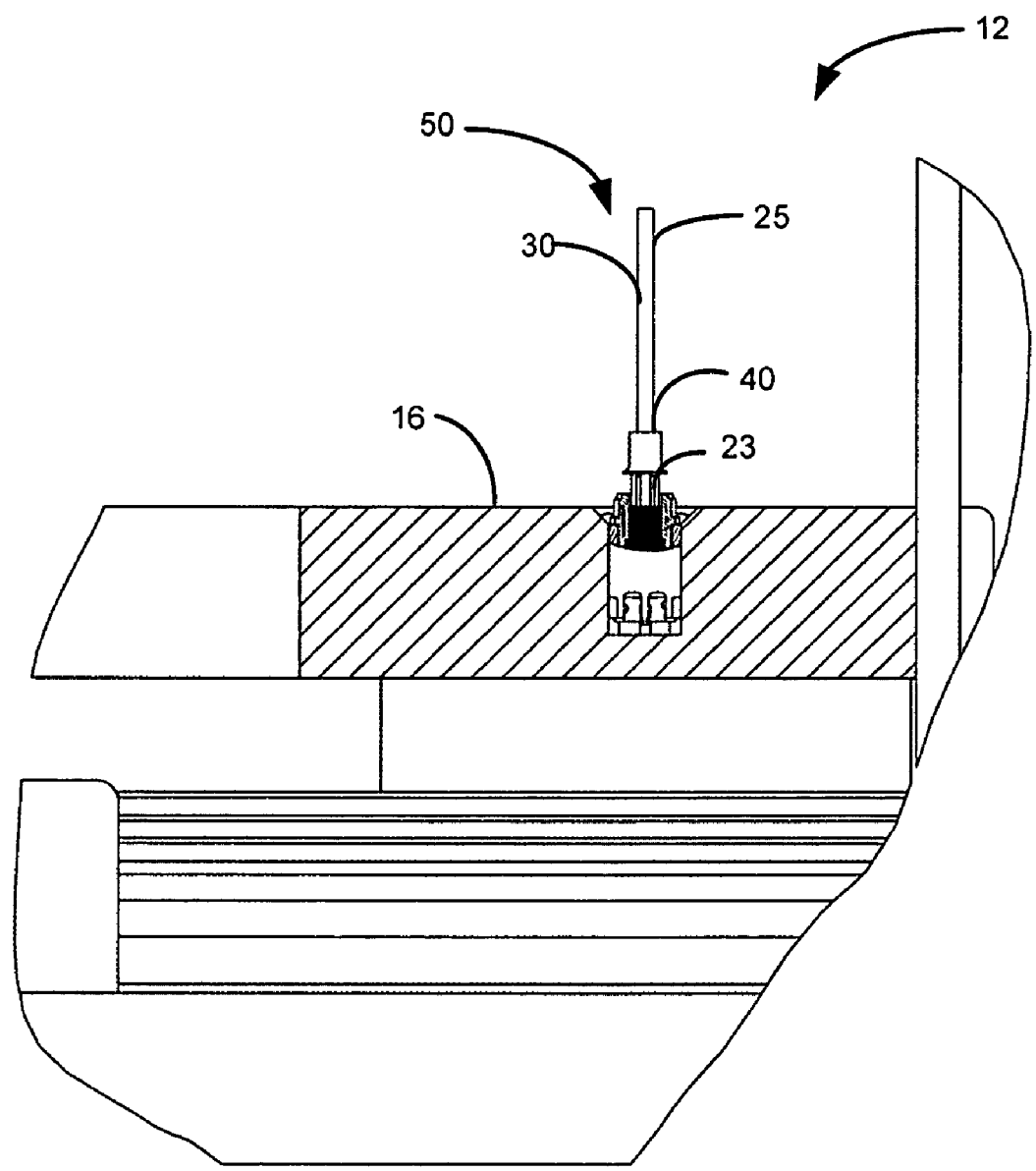
FIG. 4 is a perspective side view of an eyelet placed over a protective tube of a feed-through subassembly held in position by a securing device.

When feed-through subassembly 22 is correctly positioned (i.e. located at a specified depth of counter-bore 28), eyelet positioning system 10 automatically closes heat grippers 36 around protective tube 32. Heat is then transferred to protective tube 32 from heat grippers 36. In one embodiment, control module 15 signals heater 13 in order to control heat variables (e.g. time, temperature, etc.) During heat transfer, a portion or all of protective tube 32 shrinks around wires 30. After a certain amount of time, eyelet positioning system 10 automatically opens heat grippers 36, thereby releasing feed-through assembly 22. As a result of the heat operation, a formed section 23 of protective tube 32 is produced, as shown in FIG. 3B. Formed section 23 of protective tube 32 includes a different diameter compared to a portion 25 of protective tube 32. The different diameter of formed section 23 is a ridged area or flanged end. Eyelet 40 is then slid over wires 30 and onto formed section 23 towards the feed-through insulator/counter-bore area. Eyelet 40 is seated against the insulator member 26 and in counter-bore 28 of the feed-through subassembly 22. Thereafter, feed-through assembly 50 is removed from securing device 12.

Figure 5:
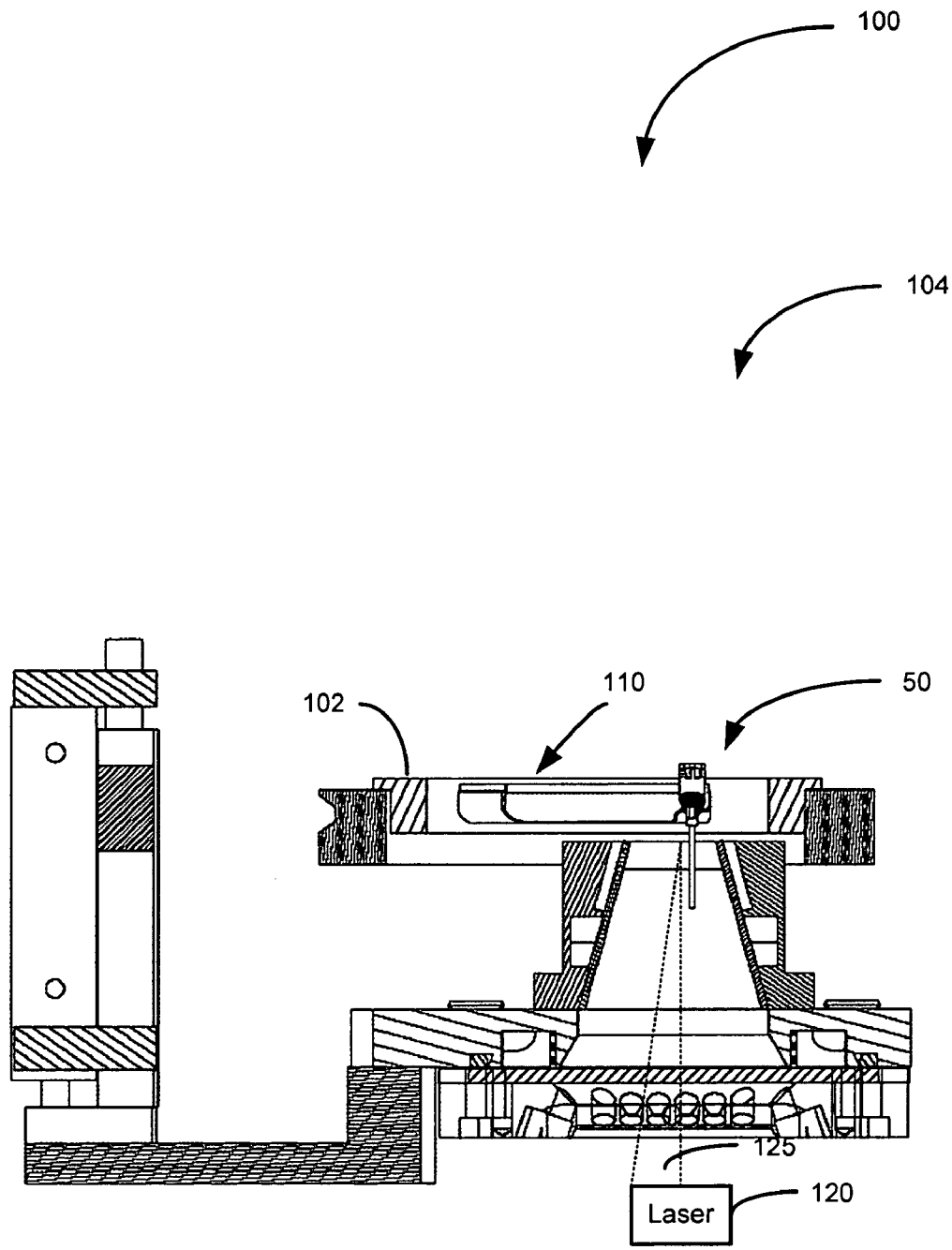
FIG. 5 is a perspective view of a welding system.

Referring to FIG. 5, welding equipment 100 performs a welding operation on a device 110 that includes feed-through assembly 50. Welding device 100 includes holder 102. Holder 102 positions device 110 in position, while laser 120 emits a beam 125 that melts a portion of metal along a seam of device 110. Feed-through assembly 50, connected to device 110, extends wires 30, protective tube 32, and eyelet 40 in a downward direction while the welding operation is performed. Eyelet 40 remains in its original position over formed section 23 of protective tube 32.

Figure 6:
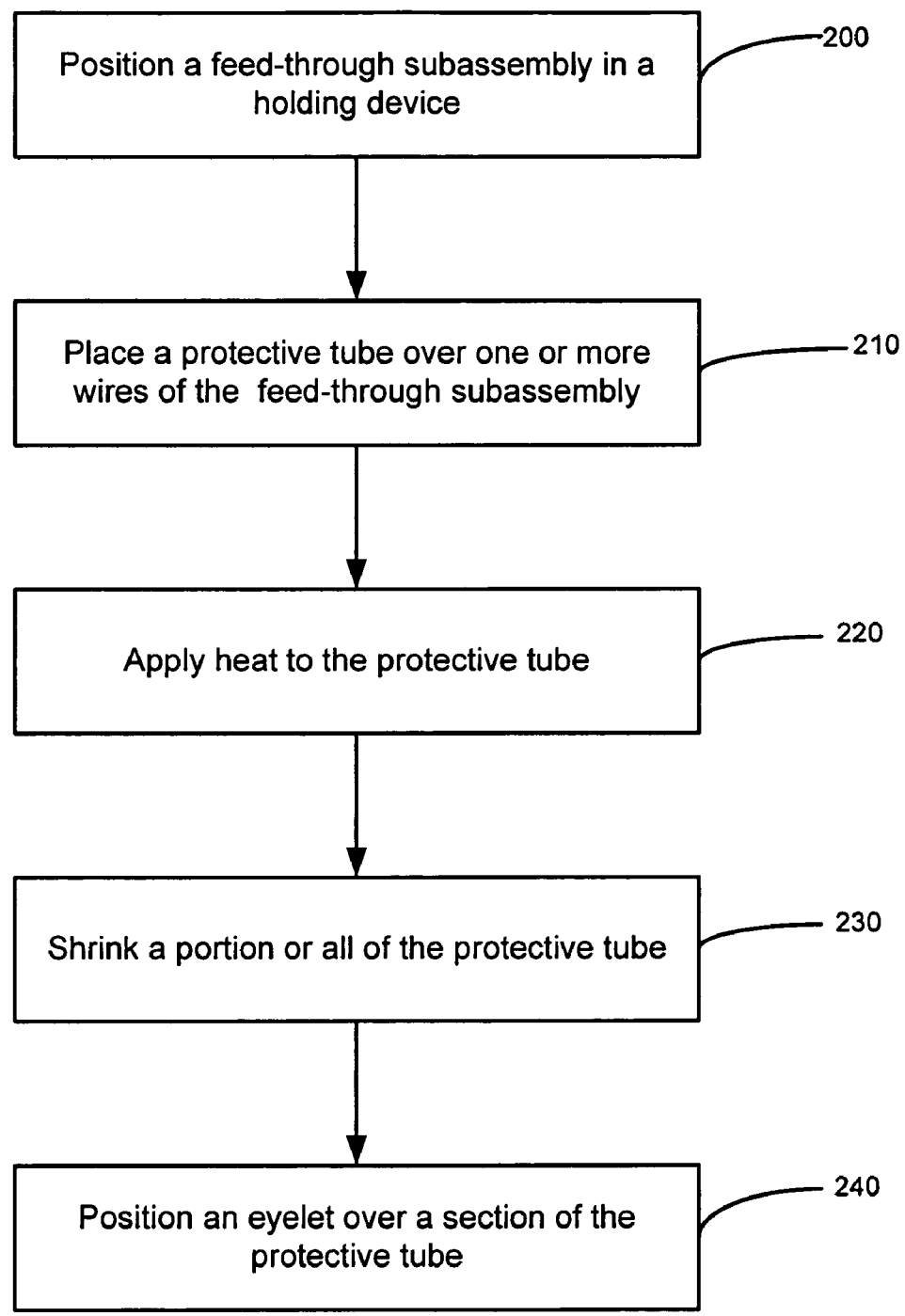
FIG. 6 is a flow diagram of a method to properly position an eyelet over a protective tube of a feed-through assembly.

FIG. 6 is a flow diagram that depicts proper positioning of an eyelet of a feed-through assembly. At operation 200, a feed-through subassembly is positioned in a holding device such that one or more wires are pointed in an upward direction. A protective tube is placed over one or more wires at operation 210. Heat is applied to the protective tube at operation 220. Typically, the protective tube is exposed to heat via heat grippers in a range of about 650° F. to about 1,000° F. The heat is monitored and controlled by closed loop controllers. The heating operation generally takes about 4 seconds to about 10 seconds. A portion of the protective tube is shrunk to create a formed section (e.g., ridged area, flanged end, etc.) over the wires at operation 230. Optionally, an operator may visually observe and/or adjust the shrink operation (e.g. stop, increase, or decrease the speed of the shrink operation). For example, the operator visually gages the amount of exposure time and the traverse speed based on the amount and rate of the shrink of the protective tube onto the wires. The operator then determines if the protective tube is completely reduced along the wires all the way up to a protection tube. An eyelet is securely seated over the ridged area or flanged end to produce a feed-through assembly at operation 240. This process reduces up to fifty percent defective feed-through assemblies.

The present invention has numerous applications. For example, while the figures relate to quadripolar feed-through assemblies, other types of feed-through assemblies may also rely on this process to reliable produce quality feed-through assemblies. Additionally, while the operation is described relative to a semi-automatic operation, it may also be implemented entirely automatically or manually.

The description of the invention is merely exemplary in nature and, thus, variations that do not depart from the gist of the invention are intended to be within the scope of the invention. Such variations are not to be regarded as a departure from the spirit and scope of the invention.

The invention claimed is:

1. A method for positioning an eyelet in an electrical feed-through subassembly having a conductor formed by a plurality of wires, comprising:
   placing a protective tube over the plurality of wires;
   applying heat to the protective tube;
   shrinking a portion of the protective tube around the wires;
   forming a ridged area in the protective tube; and
   sliding an eyelet over the wires and onto the ridged area.

2. The method of claim 1, further comprising:
   mounting the feed-through subassembly to a first portion of a shield such that the wires are pointed in a downward direction.

3. The method of claim 2, further comprising:
   welding the first portion of the shield to a second portion of the shield.

4. The method of claim 1, further comprising:
   seating the eyelet in position on the ridged area to retain the eyelet in position during a welding operation.

* * * * *